UNITED STATES PATENT OFFICE.

ALFRED ADDISON BLANDY, OF LONDON, ENGLAND.

PROCESS OF AND COMPOSITION FOR MANUFACTURING SUBSTITUTES FOR INDIA-RUBBER, &c.

SPECIFICATION forming part of Letters Patent No. 522,312, dated July 3, 1894.

Application filed June 10, 1893. Serial No. 477,213. (No specimens.) Patented in England September 3, 1890, No. 13,864, and in Belgium December 31, 1890, No. 93,296.

*To all whom it may concern:*

Be it known that I, ALFRED ADDISON BLANDY, M. D., a citizen of the United States of America, residing at 56 Netherwood Road, West Kensington, London, England, have invented certain new and useful Improvements in the Process of and Composition for the Manufacture of a Substitute for India-Rubber, &c., (for which I have made application for Letters Patent in Great Britain, No. 13,864, dated September 3, 1890, and have obtained Letters Patent in Belgium, No. 93,296, dated December 31, 1890,) of which the following is a specification.

My present invention relates to improvements in the combination and treatment of certain materials for the production of substances to be used as substitutes for leather, india rubber, and like substances, and for other purposes generally to which it may be applicable; and the object of my said invention is the production of a substance composed of cheap and easily procured elements, and which, by the process or processes and the combinations hereinafter described, has many advantages; as, for instance, it is capable of taking the place and fulfilling the use of india rubber and of leather in a variety of applications, in a better and more economic manner than substitutes hitherto produced by others than myself.

Any of the fixed oils known as drying oils can be used, but most advantageously linseed oil from its abundance is selected; olei ricini (castor oil) has very many advantageous qualities, but its cost and scarcity are objections; the oil when selected is reduced by any well known or suitable process of oxidation to more or less of a solid elastic contractile condition.

For the sake of example I will describe my invention as carried out with linseed oil, it, of course, being understood that other suitable oils—the equivalent or otherwise of linseed oil—may be used if desired.

To a given quantity of linseed oil I add ten per cent (10%) by weight of a suitable solvent for instance bisulphide of carbon or coal naphtha and one per cent (1%) by weight of the oil of sulphur chloride, e. g. linseed oil, one hundred pounds; bisulphide of carbon, ten pounds; sulphur chloride, one pound. The two latter are first mixed together and then mingled with the said oil and the compound is brought by gentle heating to the consistency desired, viz., more or less of a solid elastic contractile condition and by following the above directions the oil is not vulcanized—this non-vulcanization during oxidation being an important feature in the whole process and having an important bearing on the character of the product. Next I take Trinidad asphalt (*i. e.*, natural asphalt from the asphalt lake in the Island of Trinidad) and—after the same has been cleaned from its impurities, perfectly dried, and reduced to powder, in any suitable manner—I mix and combine it under heat with the aforesaid oxidized oil in about the proportion of three to five parts by weight of this powdered asphalt to that of the oil according as a more or less elastic or rigid product is required the whole mass is well mixed under heat care being taken not to subject such mass to sufficient heat to ignite the same. This mass is well melted together and gradually brought by heat and stirring to a perfectly liquid and even state free from dross, lumps, and sediment and when it has arrived at this condition it is poured out upon suitable surfaces (such as wet cold slabs of metal or stone or upon old sail cloth covered with paste) and there sets and is thus formed into sheets or other convenient forms if desired ready for the final stages of the process.

The material thus produced up to this point (*i. e.* oxidized oil and Trinidad asphalt) for facility of description I will term "flux" as the same acts or serves as a flux or means to receive and mix therewith various gums or resinous substances such as crude rubber (*i. e.* pure new rubber) or "waste rubber" (*i. e.* old rubber, spent rubber or rubber cuttings). This flux is mixed with such gums, &c., and with the usual or any suitable vulcanizing agents and treated according to the purposes for which the product is required and as the final mixing and treatment varies according to said purpose I will therefore describe under separate numerical headings the various products and the various materials and treatments adopted to produce same according to my present invention.

First. To make a product suitable for cells, vessels, washers and other purposes where strong acids are not used, unless diluted, I take the following ingredients in the following proportions: flux, (oxidized oil and Trinidad asphalt prepared as above,) one pound; crude rubber, one pound; sulphur, one pound; lime, one-half pound. These ingredients are well mixed and worked in together by any suitable mechanical appliances. When the substance is made sufficiently homogeneous it is thoroughly dried, and the usual or suitable agents used in vulcanizing (such as those used in the vulcanization of rubber) can be worked in and the mixture of these said ingredients is completed and the mass is ready to be formed into any desired shape for the vulcanizing process when it must be subjected to a heat of say 240° (Fahrenheit) during one hour rising to 270° (Fahrenheit) and kept at about that temperature from one to four hours according to the degree of hardness or flexibility required and in this manner I thereby produce a material as a substitute for ebonite and suitable for cells, vessels, washers and for other uses where strong acids are not used unless diluted.

Second. To make a substitute for ebonite resisting almost any acid at natural temperature, I take the following ingredients in the following proportions or thereabout: flux, (prepared as above,) one pound; crude rubber, one pound; sulphur, one and one-fourth pounds; litharge, one-half pound. These are mixed and treated as described under No. 1 except that the time of vulcanization is about doubled—the heat being increased to 270° (Fahrenheit) the first hour and then raised to 275° (Fahrenheit) for eight to nine hours.

Any degree of toughness or horny flexibility or a rigid metallic character can be produced by the careful application of the aforesaid limits of the degree of heat and time in the two above cases respectively.

These No. 1 and No. 2 cases show the use of crude Mozambique rubber applied as substitutes for hard rubber and ebonite in the production of which latter pure and expensive rubbers only have hitherto been used.

Third. The production of sheets, hose, imitation leather, washers, valves, tires, and the commoner goods in general—without the use of any crude rubber. For these purposes I use the following: flux, (prepared as above,) ten pounds; best waste rubber, (such as is known as "vulcanized waste,") twelve pounds; sulphur, one and one-fourth pounds.

The flux is spread out into sheets in any convenient way. The rubber is applied by simply laying it on top of the said sheets which are then rolled up and pressed out again and again, until finally the mass becomes homogeneous. This mass is then dried in any convenient way, and the sulphur is then worked in in any suitable way. The mass when slightly warmed, may be rolled out into sheets, or may be given such form as may be required before vulcanization.

Vulcanization: The time and the heat vary according to the quality of the article required; but, as a general rule, for articles such as tubes, one hour, rising to 275° (Fahrenheit) and remaining at this heat for about two and a half hours; for articles such as valves and imitation leather goods, one hour, rising to 270° (Fahrenheit) and remaining for about two and three quarter hours; but the foregoing combinations will be found to answer as to the time and heat used in vulcanizing almost all similar rubber compounds of nearly every description.

In the first and second processes other suitable metallic oxides may be used in place of the oxides of calcium and lead, known as lime and litharge, respectively.

Having thus described my invention, what I claim as new, and desire to secure by Letters Patent of the United States, is—

1. The process of manufacturing a compound of the character described, which consists in mixing together a drying oil, a suitable solvent, and sulphur chloride, in gently heating the mixture, in then incorporating asphalt therewith, in then heating the product, in incorporating rubber and sulphur therein, and finally vulcanizing the resultant mass, substantially as and for the purposes described.

2. The process of manufacturing a compound of the character described, which consists in mixing together linseed oil, a suitable solvent, and sulphur chloride, in gently heating the mixture, in then incorporating asphalt therewith, in then heating the product, in incorporating rubber and sulphur therein, and finally vulcanizing the resultant mass, substantially as and for the purposes described.

3. The process of manufacturing a compound of the character described, which consists in mixing together a drying oil, bisulphide of carbon, and sulphur chloride, in gently heating the mixture, in then incorporating asphalt therewith, in then heating the product, in incorporating rubber and sulphur therein, and finally vulcanizing the resultant mass, substantially as and for the purposes described.

4. The process of manufacturing a compound of the character described, which consists in mixing together linseed oil, bisulphide of carbon, and sulphur chloride, in gently heating the mixture, in then incorporating asphalt therewith, in then heating the product, in incorporating rubber and sulphur therein, and finally vulcanizing the resultant mass, substantially as and for the purposes described.

5. The process of manufacturing a compound of the character described, which consists in mixing together a drying oil, a suitable solvent, and sulphur chloride, in gently heating the mixture, in then incorporating asphalt therewith, in then heating the product, in incorporating rubber, metallic oxide, and sulphur thereinto, and finally vulcanizing the resultant mass, substantially as and for the purposes described.

6. The process of manufacturing a compound of the character described, which consists in mixing together linseed oil, a suitable solvent, and sulphur chloride, in gently heating the mixture, in then incorporating asphalt therewith, in then heating the product, in incorporating rubber, a metallic oxide, and sulphur thereinto, and finally vulcanizing the resultant mass, substantially as and for the purposes described.

7. The process of manufacturing a compound of the character described, which consists in mixing together a drying oil, bisulphide of carbon, and sulphur chloride, in gently heating the mixture, in then incorporating asphalt therewith, in then heating the product, in incorporating rubber, a metallic oxide, and sulphur therein, and finally vulcanizing the resultant mass, substantially as and for the purposes described.

8. The process of manufacturing a compound of the character described, which consists in mixing together linseed oil, bisulphide of carbon, and sulphur chloride, in gently heating the mixture, in then incorporating asphalt therewith, in then heating the product, in incorporating rubber, a metallic oxide and sulphur thereinto, and finally vulcanizing the resultant mass, substantially as and for the purposes described.

9. The process of manufacturing a compound of the character described, which consists in mixing together a drying oil, a suitable solvent, and sulphur chloride, in gently heating the mixture, in then incorporating asphalt therewith, in then heating the product, in incorporating rubber, lime, and sulphur thereinto, and finally vulcanizing the resultant mass, substantially as and for the purposes described.

10. The process of manufacturing a compound of the character described, which consists in mixing together linseed oil, a suitable solvent, and sulphur chloride, in gently heating the mixture, in then incorporating asphalt therewith, in then heating the product, in incorporating rubber, lime, and sulphur therein, and finally vulcanizing the resultant mass, substantially as and for the purposes described.

11. The process of manufacturing a compound of the character described, which consists in mixing together a drying oil, bisulphide of carbon, and sulphur chloride, in gently heating the mixture, in then incorporating asphalt therewith, in then heating the product, in incorporating rubber, lime, and sulphur therein, and finally vulcanizing the resultant mass, substantially as and for the purposes described.

12. The process of manufacturing a compound of the character described, which consists in mixing together linseed oil, bisulphide of carbon, and sulphur chloride, in gently heating the mixture, in then incorporating asphalt therewith, in then heating the product, in incorporating rubber, lime, and sulphur thereinto, and finally vulcanizing the resultant mass, substantially as and for the purposes described.

13. A composition of matter as a substitute for india rubber, consisting of a drying oil, a solvent of the same, sulphur chloride, asphalt, rubber, and sulphur.

14. A composition of matter as a substitute for india rubber, consisting of a drying oil, carbon bisulphide, sulphur chloride, asphalt, rubber, and sulphur.

15. A composition of matter as a substitute for india rubber, consisting of a drying oil, a solvent of the same, sulphur chloride, asphalt, rubber, a metallic oxide, and sulphur.

16. A composition of matter as a substitute for india rubber, consisting of a drying oil, carbon bisulphide, sulphur chloride, asphalt, rubber, a metallic oxide, and sulphur.

17. A composition of matter as a substitute for india rubber, consisting of a drying oil, a solvent of the same, sulphur chloride, asphalt, rubber, lime, and sulphur.

18. A composition of matter as a substitute for india rubber, consisting of a drying oil, carbon bisulphide, sulphur chloride, asphalt, rubber, lime, and sulphur.

In testimony that I claim the foregoing as my invention I have signed my name in presence of two subscribing witnesses.

ALFRED ADDISON BLANDY.

Witnesses:
  HENRY BIRKBECK,
34 *Southampton Buildings, London, England, Chartered Patent Agent.*
  HUBERT W. EVANS,
19 *Walfington Road, West Norwood, Clerk to the above named.*